Feb. 18, 1969   E. FEDER   3,428,272
MODULAR SEAL FOR AIRCRAFT LAUNCHING CYLINDER
Filed Jan. 18, 1967

INVENTOR.
ERNEST FEDER

BY *Melvin Pearson Williams*

ATTORNEY

# United States Patent Office 3,428,272
Patented Feb. 18, 1969

3,428,272
MODULAR SEAL FOR AIRCRAFT LAUNCHING CYLINDER
Ernest Feder, Hartford, Conn., assignor to United Aircraft Corporation, East Hartford, Conn., a corporation of Delaware
Filed Jan. 18, 1967, Ser. No. 610,131
U.S. Cl. 244—63          6 Claims
Int. Cl. B64f 1/06, 1/26; F01b 29/10

ABSTRACT OF THE DISCLOSURE

A pneumatic cylinder for launching aircraft (similar to a catapult) having an elongated longitudinal slot extending the length thereof is provided with a plurality of modular pneumatic closures, in end-abutting relationship, for sealing the slot. Inflation of individual modular sections of the closure so as to effect a sealing of the longitudinal slot is sequentially programmed so that closure sections which are ahead of the advancing cylinder and launching device are open, thereby permitting escape of fluid within the cylinder resulting from the decrease in volume caused by the advancing of the cylinder. As the cylinder approaches each section, it actuates valve operating mechanisms so as to introduce fluid pressure into a section of the seal which it is approaching; a structural member which connects the cylinder through the slot with a launching device presses between opposing faces of the seal as it passes each section, the pressure within the sections of seal becoming maximum as the member is passing therethrough, whereby the seal sections each close after the member passes between them so that the cylinder is completely sealed in all sections behind the advancing cylinder.

CROSS-REFERENCE TO RELATED APPLICATIONS

The present invention is particularly well-suited for use in aircraft launching systems of the type disclosed in the copending application of the same assignee entitled Aircraft Launching, filed on even date herewith by John M. Tyler, Ser. No. 610,132. The invention may be utilized to advantage together with an aircraft launching cylinder structure of the type illustrated in another copending application of the same assignee entitled, Floating Pneumatic Thrust Cylinder for Aircraft Launching System, filed on even date herewith by Ernest Feder, John Kransnitski and Peter T. Vercellone, Ser. No. 610,130.

BACKGROUND OF THE INVENTION

Field of invention

This invention relates to aircraft launching systems, and more particularly to modular closure means for a longitudinal slot in the top of a pneumatic aircraft launching cylinder.

Description of the prior art

One type of aircraft launching system known to the prior art utilizes fluid under pressure to force a piston along a cylinder, the cylinder having an elongated slot extending longitudinally thereof to permit connection of the launching device external of the cylinder with the piston which is internal thereof. In order to maintain pressure in the cylinder behind the piston, a closure is provided to seal the slot behind the piston as the piston traverses the length of the cylinder. The most common manner of effecting a seal between the closure and the cylinder utilizes the fluid pressure within the cylinder to force the closure upwardly against adjacent edges of the longitudinal slot in the cylinder. Seals of this type are illustrated in U.S. Patents No. 2,200,427; 2,485,601; 2,703,211; 2,792,755 and 3,028,125. A slightly different method of effecting a seal is illustrated in U.S. Patent No. 2,497,916 wherein pressure within the cylinder is forced behind a pair of closure members so as to cause lateral motion and mutual opposing lateral pressure to seal the slot. All of the foregoing closures rely on the integrity of the closure itself to maintain the pressure which provides the seal of the closure. In other words, since pressure within the cylinder provides the force which completes the seal of the closure, and the pressure within the cylinder cannot be maintained without an adequate seal of the closure, a rupture at any point along the length of the closure will cause the very force, which holds the closure in sealed position, to be lost. Thus, there is no "puncture integrity" in closures of this type. Additionally, closures which comprise essentially a single elongated ribbon which is held in place by pressure within the cylinder are limited in the maximum length within which they may be configured due to the tendency for long lengths of such closures to whip and/or present difficulty in achieving proper alignment. Furthermore, flexible closures which are not operatively engaged or supported throughout the length of the cylinder (that is, both before and after the piston) present large masses which are difficult to handle.

Another type of closure is illustrated in United Kingdom Patent No. 10,471, issued in 1845 to Dubern.

Therein, a pair of spring steel members cooperate with heavy grease so as to close the longitudinal slot of a cylinder. However, this device requires constant replenishment of the grease after a certain number of uses, and is limited in the amount of pressure which the closure will confine.

A more practical seal is described in a United Kingdom Patent No. 10,045, issued to Newton in 1844. Therein a seal is comprised of a pair of flexible tubes, one on each side of the slot, said tubes, when inflated under pressure sealing off the longitudinal slot. This type of seal has the one disadvantage, mentioned hereinbefore, that it does not have puncture integrity so that should there be a puncture at any point along either one of the pressurized tubes, the entire seal will become depressurized nearly instantly and therefore the longitudinal slot becomes unsealed.

SUMMARY OF INVENTION

The object of the present invention is to provide an improved closure for the longitudinal slot of an extensive pneumatic launching cylinder of an aircraft launching system.

According to the present invention, closure of the longitudinal slot of a pneumatic cylinder used for launching aircraft in response to fluid under pressure is achieved with a pair of flexible structures disposed on opposite sides of the slot so that, when they are inflated, they abut one another and effectively seal off the slot. The invention herein particularly relates to the sectionalizing of the pair of inflatable members such that should one section of one of the members fail to hold pressure, the seal for the entire length of the slot is not lost, but rather, leakage through one section only will result.

The invention is particularly well suited to extremely long launching cylinders, but is adapted for use in launching cylinders of the catapult type known to the prior art.

In accordance with a further aspect of the present invention, the different sections of a seal for a longitudinal slot in an aircraft launching cylinder are programmed so as to be deflated in front of the launching mechanism and inflated behind it, thereby the longitudinal slot may vent pressurized fluid ahead of the launching device, yet be effectively sealed behind the launching device. In one embodiment of the invention, the successive inflation of sequential sections of the seal is effected so as to apply full pressure to each section just as the launching mechanism is passing therethrough, whereby the launching mechanism may proceed between the opposing sections of the closure with a minimum of effort while at the same time the closure will be fully pressurized, thereby insuring a seal, immediately behind the launching mechanism.

Other objects, features and advantages of the present invention will become more apparent in the light of the following detailed description of a preferred embodiment thereof as illustrated in the accompanying drawing.

DESCRIPTION OF THE PREFERRED EMBODIMENT

Figure 1:
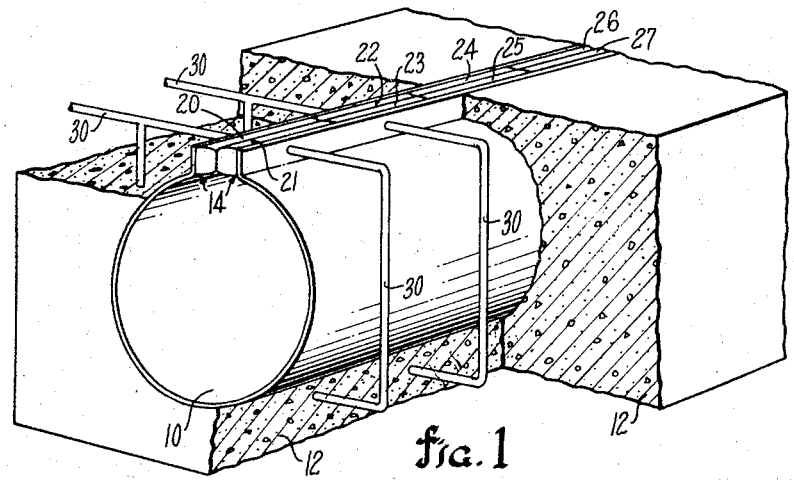
FIG. 1 is a partially broken away perspective of an aircraft launching cylinder incorporating modular seals in accordance with the present invention.
Figure 2:
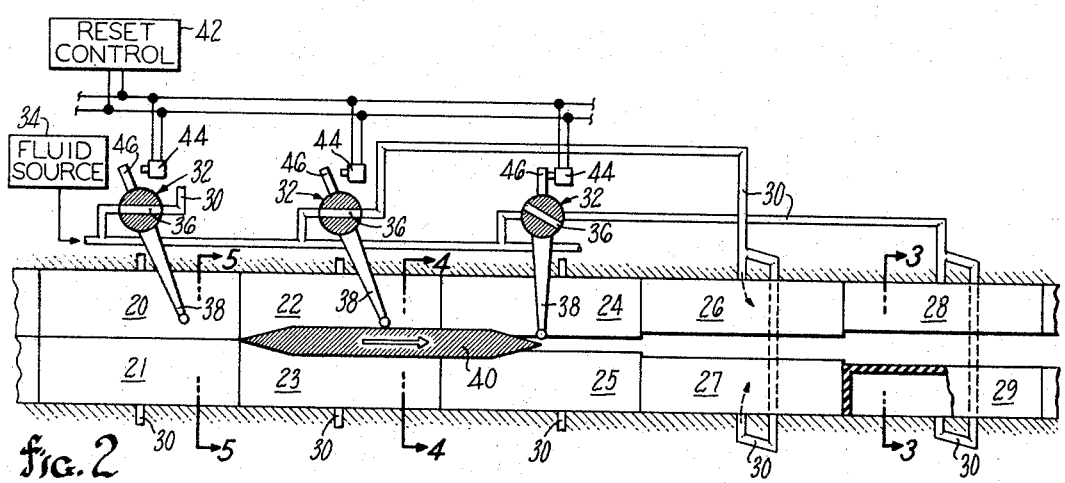
FIG. 2 is a plan view of the apparatus shown in FIG. 1.
Figure 5:
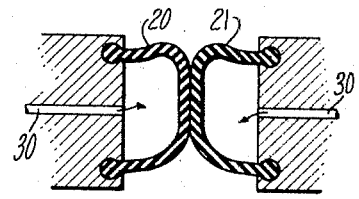
FIG. 5 is a section taken on the line 5—5 in FIG. 2.
Figure 4:
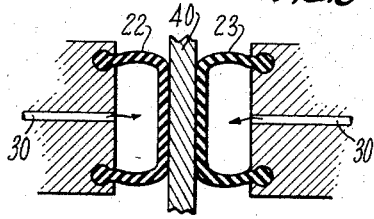
FIG. 4 is a section taken on the line 4—4 in FIG. 2.

Referring now to FIG. 1, an aircraft launching cylinder 10 is disposed in a foundation 12 which may comprise concrete or other suitable material. The cylinder 10 is of generally cylindrical cross section having an elongated slot 14 extending longitudinally thereof. The slot 14 may be closed by suitable sections 20–29 of inflatable closures which, when suitably inflated under pressure, will effectively seal off the slot 14 (as shown in FIG. 5). The closure sections 20–29 are inflated by pressurized fluid (such as air) supplied thereto through fluid control means including a plurality of pipes or conduits 30, which are supplied fluid through valves 32 that selectively pass pressurized fluid from a source 34 to the pipes or conduits 30 whenever a valve 32 is rotated so that a passage 36 therein is aligned with the respective pipe 30. Rotation of the valves 32 is effected so as to open the valves by an actuator arm 38 being pushed to the right (as shown in FIG. 2) by the structural member 40 which passes upwardly through the slot that is connecting a driving piston with a driven cart as is well known in the catapult art. The valves 32 may be reset to the closed position (as seen in FIG. 2 for the closure sections 24, 25) by a reset means including a control 42 which is connected to a plurality of magnetic actuators 44 (such as solenoids), there being one such actuator for each valve 32. Magnetic force in the actuators 44 attracts reset arms 46 on each of the valves, whereby the valves may be returned to the closed position (as seen for closure sections 24 and 25 of FIG. 2) all at one time under a common control.

Figure 3:
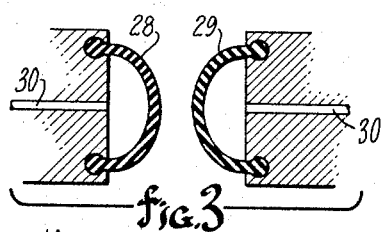
FIG. 3 is a section taken on the line 3—3 in FIG. 2.

In operation, the driving piston and the launching apparatus, which are represented in FIG. 2 by the structural member 40 connecting them, travel from left to right as shown in FIG. 2. Ahead of the structural member 40, the slot is kept open (as shown by closure members 28, 29—FIG. 3) so as to vent the cylinder ahead of the approaching piston. Then pressure is applied to close the slot behind the structural member 40. The pressure may be applied successively to correct sections by means of the valves 32 being opened in advance of the time when the structural member 40 will reach the related sections of the closure. Since it takes a finite time to pressurize the sections as a result of application of fluid pressure thereto, the sections may be pressurized in such a manner that they can begin to close off the slot as the structural member 40 appears, reaching full pressure when the structural member is therebetween so that the sections will be sealed behind the structural member.

The reset control 42 may be actuated electrically either manually or by means of an actuator along the length of the cylinder. One particularly advantageous usage of the reset control 42 is achieved by having a switch means operated by the structural member 40 or other portion of the launching apparatus at the time when the launching apparatus is near the downstream end of the launching cylinder, whereby all of the seals may be opened at once permitting a release of the pressure behind the aircraft launching mechanism so that the mechanism may rapidly decelerate near the end of the launching cylinder.

The length of each of the sections 20–29 will vary with any utilization of the invention. For instance, the lengths may be made very small so as to give incremental programming control to the inflation thereof; on the other hand, in a system where the pneumatic launching cylinder may reach a length on the order of magnitude of two miles (as in the aforementioned Tyler application), the number of sections and valve means therefor becomes very excessive if the lengths are kept small relative to the length of the launching apparatus; therefore, lengths of 50 or 100 feet may be utilized. It should be noted that one of the advantages of the present invention is to prevent a puncture in any one seal from being very significant relative to the seal in the entire cylinder; thus if the cylinder is two miles long, a loss of a 100 foot section would not result in sufficient demission of pressure so as to prevent the launching of an aircraft during the run in which the puncture occurs. On the other hand, in a short catapult system of the type used heretofore on ships, a launching cylinder on the order of one or two hundred feet may comprise sections having a length of about 20 feet. The particular length is left to the design skill of the art so as to suit the architectural requirements of any system in which the present invention is utilized.

Although the invention has been shown and described with respect to a preferred embodiment thereof, it should be understood by those skilled in the art that the foregoing and various other changes and omissions in the form and detail thereof may be made therein without departing from the spirit and the scope of the invention.

Having thus described a preferred embodiment of my invention, what I claim as new and desire to secure by Letters Patent of the United States is:

1. A closure for a pneumatic launching cylinder of the type used in aircraft launching apparatus, comprising:
    a plurality of mutually opposing cooperating sections disposed adjacent an elongated slot extending longitudinally of said cylinder, each of said sections being separately inflatable by fluid pressure so as to extend transversely of said slot when inflated, there being a sequence of sections disposed in end-abutting relationship adjacent each side of said slot;
    and fluid supply means in fluid communication with each of said sections.

2. The invention described in claim 1 wherein said fluid supply means includes a plurality of individually operable fluid control means, each section relating to one of said fluid control means.

3. The invention described in claim 2 including actuation means adapted for operation by launching apparatus being propelled along the pneumatic launching cylinder to sequentially operate successive ones of said fluid control means.

4. The invention described in claim 3 wherein said fluid control means comprise fluid valves and said actuation means comprises mechanically actuatable levers which are adapted to move said valves from a closed to an open position in response to the motion of an aircraft launching apparatus along said pneumatic cylinder.

5. The invention described in claim 4 including reset means for resetting all of said fluid control means to a closed position.

6. The invention described in claim 1 wherein the length of each of said sections is relatively small in comparison with the overall length of said aircraft launching cylinder.

References Cited

UNITED STATES PATENTS 2,497,916  2/1950  Stambaugh _____ 244—63
2,953,065  9/1960  Brown _____ 244—63

FOREIGN PATENTS

Ad. 64,302  6/1955  France.

FERGUS S. MIDDLETON, *Primary Examiner.*

P. E. SAUBERER, *Assistant Examiner.*

U.S. Cl. X.R.

92—88